United States Patent [19]
Schierling

[11] Patent Number: 5,967,899
[45] Date of Patent: Oct. 19, 1999

[54] CENTRIFUGAL MASS DEVICE WITH AN AXIAL SLIDE BEARING AS SEAL

[75] Inventor: Bernhard Schierling, Kürnach, Germany

[73] Assignee: Mannesman Sachs AG, Schweinfurt, Germany

[21] Appl. No.: 08/937,086

[22] Filed: Sep. 24, 1997

[30] Foreign Application Priority Data

Sep. 26, 1996 [DE] Germany ............................ 196 39 562
Jun. 20, 1997 [DE] Germany ............................ 197 26 262

[51] Int. Cl.$^6$ ....................................................... F16D 3/80
[52] U.S. Cl. ............................................. 464/24; 192/208
[58] Field of Search ........................ 464/24, 68; 192/208, 192/55.4; 74/574

[56] References Cited

U.S. PATENT DOCUMENTS

| | | |
|---|---|---|
| 4,962,838 | 10/1990 | Clancey . |
| 4,963,119 | 10/1990 | Graton . |
| 5,180,044 | 1/1993 | Fukushima et al. ..................... 192/208 |
| 5,249,659 | 10/1993 | Fukushima ............................. 192/208 |
| 5,269,198 | 12/1993 | Fukushima ............................. 192/208 |
| 5,649,864 | 7/1997 | Rohrle et al. .............................. 464/24 |
| 5,668,478 | 9/1997 | Schierling et al. ...................... 192/208 |
| 5,816,973 | 10/1998 | Sudau et al. ............................... 74/574 |

FOREIGN PATENT DOCUMENTS

| | | |
|---|---|---|
| 0 251 849 | 1/1988 | European Pat. Off. . |
| 0 403 338 | 12/1990 | European Pat. Off. . |
| 44 17 108 A 1 | 5/1994 | Germany . |
| 2 310 912 | 9/1997 | United Kingdom . |
| 2 310 910 | 10/1997 | United Kingdom . |
| WO 95/14181 | 5/1995 | WIPO . |
| WO 96/00859 | 1/1996 | WIPO . |

*Primary Examiner*—Eileen Dunn Lillis
*Attorney, Agent, or Firm*—Cohen, Pontani, Lieberman & Pavane

[57] ABSTRACT

A centrifugal mass device having at least two centrifugal masses which are rotatable relative to each other against the effect of elastic elements of a torsional damping device. The output-side centrifugal mass, which is more distant from a drive, e.g., the crankshaft of an internal combustion engine, is run radially as well as axially relative to the drive-side centrifugal mass via a support. The support has an axial slide bearing that borders a grease chamber containing a viscous medium, which grease chamber accommodates, at least partially, the torsional damping device. To form a seal for the grease chamber, the axial slide bearing is radially encompassed along at least a portion of its axial extension by at least one axial projection provided on at least one of the centrifugal masses, whereby the axial projection is close to but separated by a gap from an associated region of the other centrifugal mass.

10 Claims, 2 Drawing Sheets

CENTRIFUGAL MASS DEVICE WITH AN AXIAL SLIDE BEARING AS SEAL

BACKGROUND OF THE INVENTION

1. Field of the Invention

This invention relates to a centrifugal mass device with at least two centrifugal masses rotatable to one another.

2. Description of the Prior Art

A centrifugal mass device with centrifugal masses rotatable relative to each other against the effect of the elastic elements of a torsional damping device is known from DE 44 17 108 A1. The output-side centrifugal mass, which is more distant from a drive, e.g., the crankshaft of an internal combustion engine, is run radially as well as axially relative to the drive-side centrifugal mass via a support. The support is formed by means of a two-part slide bearing, which has a fixed, radially inner ring on the drive-side centrifugal mass and a fixed, radially outer ring on the output-side centrifugal mass. Because each of these two rings has a radial leg, as shown in the Offenlegungsschrift, the support acts as an axial slide bearing. The radial leg of the radially inner ring borders a grease chamber that accommodates the torsional damping device.

In such an embodiment of an axial slide bearing, as long as the axial force of a pressure spring of the friction clutch is active in the engaged state and/or the pre-load of a disengagement device (not shown) is active in the axial direction, the output-side centrifugal mass is pressed toward the drive-side centrifugal mass and, as a result, the radial legs of the two rings are held against each other. In this way, the grease chamber is sealed in the region of the support.

However, in other situations, e.g., during transport, assembly, or measurement of the centrifugal mass device, no axial pre-load is applied, and a gap can develop between the radial legs of the two rings. This gap can also occur—though only briefly—when, upon application of an axial pre-load, this pre-load is neutralized due to the wobbling movements of the output-side centrifugal mass when the friction clutch is in the disengaged state. Under these circumstances, the viscous medium contained in the grease chamber emerges from the centrifugal mass device via the support. The lack of viscous medium is then reflected in weaker damping behavior during operation of the centrifugal mass device.

The object of the invention is to provide a centrifugal mass device wherein, in the region of an axial slide bearing the emergence of viscous medium from a grease chamber onto the slide bearing is prevented.

SUMMARY OF THE INVENTION

The above stated object is obtained according to the invention. In the centrifugal mass device of the invention the axial slide bearing of a support is radially encompassed, along at least a portion of its axial extension, by at least one axial projection provided on at least one of the centrifugal masses. Consequently, the grease chamber is separated from the axial slide bearing. Since the axial projection is close to, but separated by a gap from, the associated region of the other centrifugal mass, the separation of the grease chamber from the axial slide bearing is sufficient to prevent the medium contained in the grease chamber (particularly when this medium is highly viscous) from flowing through the gap to the extension area of the axial slide bearing. This arrangement is especially effective since the aforementioned separation—and thus the gap—are located radially outside of the axial slide bearing, so that during operation of the centrifugal mass device, the viscous medium is propelled away from the separation rather than being led toward it. Should any viscous medium actually penetrate the gap and reach the axial slide bearing when the centrifugal mass device is at a standstill, that material will be moved radially outward and back into the grease chamber when the centrifugal mass device is again operated. As a result, the seal according to the invention, although contact-free, provides excellent protection against the loss of viscous medium from the grease chamber. Since the axial projection is radially offset relative to the axial slide bearing, the seal is effective even when no axial force from the pressure spring of the friction clutch or its disengagement device acts upon the centrifugal mass device or the axial bearing, for reasons of transport, assembly or measurement. The axial projection prevents any viscous medium that reaches it from penetrating to the axial slide bearing.

In a preferred embodiment of the invention the axial slide bearing is arranged in a recess in one centrifugal mass and the axial projection on the other centrifugal mass enters into this recess. Viscous medium from the grease chamber must first enter this recess prior to reaching the aforementioned gap.

In a further preferred embodiment of the invention, an axial projection is provided on each of the two centrifugal masses, and the two axial projections are oriented toward each other. This arrangement makes it possible to establish the position of the gap between the two axial projections in the axial direction relative to the axial slide bearing.

In another embodiment which further improves the sealing action of the axial slide bearing arrangement, the axial energy storage device presses the centrifugal masses against the supporting surfaces of the axial slide bearing, even when the pre-load produced by the pressure spring of the friction clutch and/or a disengagement device is briefly neutralized due to wobbling movements of the output-side centrifugal mass when the friction clutch is disengaged.

Other embodiments are distinguished by their special simplicity of design. The axial projection of the axial slide bearing is directed toward the adjacent component, which is connected to the drive-side centrifugal mass. The axial projection encompasses this adjacent component and therefore forms an impact surface for the viscous medium that is forced axially between the teeth when the planetary gears 50 roll on the internal gear 11 and is then propelled as splash grease into the region of the axial slide bearing 21. Upon contacting the axial projection, the splash grease loses most, if not all of its kinetic energy, and any remaining energy is insufficient for the grease to leave the grease chamber, especially when an additional seal is formed radially inside of this axial projection by the component of the drive-side centrifugal mass resting on the axial slide bearing.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE PRESENTLY PREFERRED EMBODIMENTS

Figure 1:
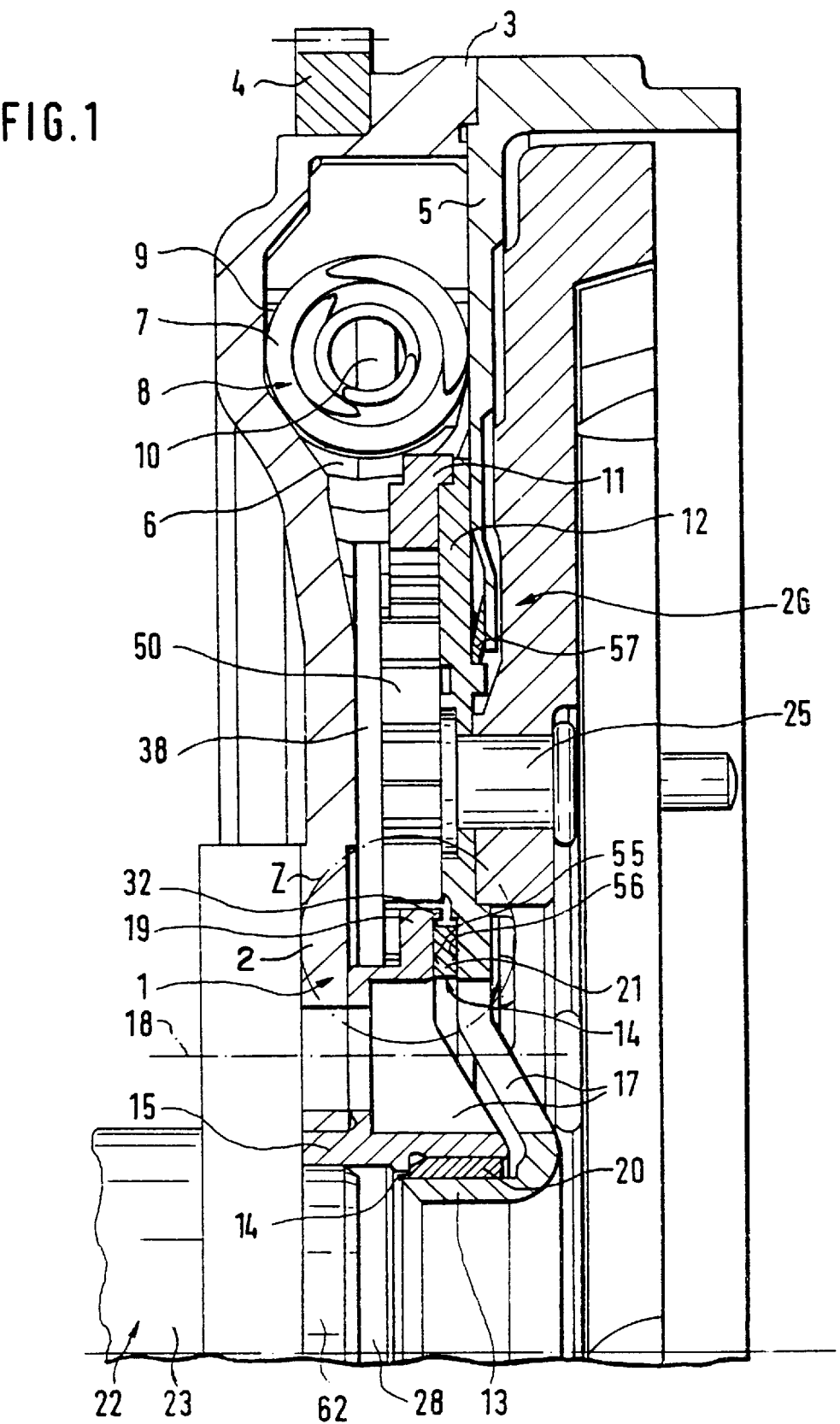
FIG. 1 is a longitudinal section through a halved view of the centrifugal mass device with an axial slide bearing that has an associated seal in its circumferential region.

Referring to FIG. 1, the centrifugal mass device has a drive-side centrifugal mass 1 with a primary flange 2. The primary flange 2 extends radially outward and, in its circumferential region, has an axial edge 3 on which is placed an annular gear 4 that is engaged with a starting pinion (not shown). Attached to the axial edge 3 is a sealing plate 5, which extends radially inward and, on its radially inner end, has a disk spring that serves as an axial energy storage device 57. The sealing plate 5, together with the axial edge 3 and the primary flange 2, borders a grease chamber 6, in which are arranged elastic elements 7 of a damping device 8. The elastic elements 7, which run in the circumferential direction in the radially outer region, can be subjected to pressure on one side by means of controlling elements 9 on the primary flange 2. On the other side, the elastic elements 7 are supported on fingers 10, which extend radially outward from a hub disk 12. The hub disk 12 is securely connected to an internal gear 11 of a planetary gear 50 and, on its radially inner end, has a secondary hub 13 to accommodate a radial slide bearing 20 of a support 14. The slide bearing 20, for its part, carries a primary hub 15 for the primary flange 2. Seen in the axial direction, the primary hub 15, starting from the primary flange 2, extends with its free end toward the hub disk 12, while the secondary hub 13 runs with its free end from the hub disk 12 toward the primary flange 2.

The hub disk 12, which is connected to an output-side centrifugal mass 26 via rivets 25, is arranged on the drive-side centrifugal mass 1 by means of the radial slide bearing 20. The hub disk 12 is equipped with assembly openings 17, which are radially close outside of the radial slide bearing 20. Attachment means 18 (not shown, but indicated in FIG. 1 by dash-dotted lines) can be inserted through the assembly openings 17. The centrifugal mass device can be attached via the attachment means 18 to a crankshaft 23 of a drive 22, e.g., an internal combustion engine—specifically, in such a way that the crankshaft 23 is accommodated in a radial centering 28 of the drive-side centrifugal mass 1 via a stub shaft 62 that extends into the primary hub 15 of the drive-side centrifugal mass 1.

Figure 2:
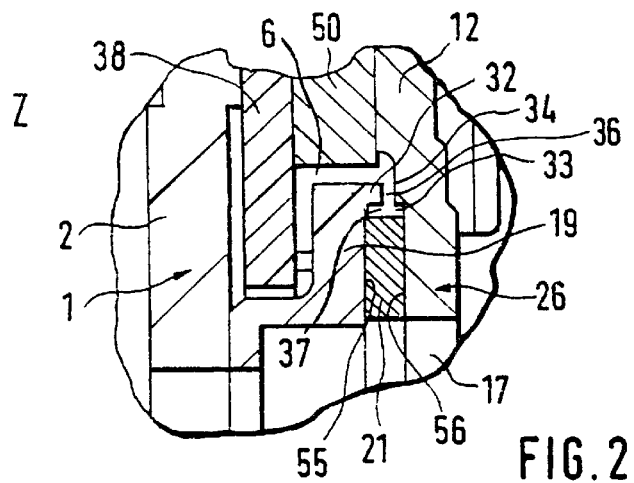
FIG. 2 is an enlarged detail of the region circled and identified as 2 in FIG. 1, showing the seal.

Radially outside of the attachment means 18, an axial slide bearing 21 of the support 14 is located axially between a ring 19 (which is held against the primary flange 2 by the attachment means 18) and the hub disk 12. The axial slide bearing 21 is radially encompassed—specifically, along a large part of its axial extension (FIG. 2)—by an axial projection 32 extending from the circumferential region of the ring 19 and in the direction and toward the hub disk 12. In the radial extension area of the axial projection 32, and separated from the axial projection 32 by only a gap 36, there is a further axial projection 34 on the hub disk 12. This axial projection 34 projects, relative to a recess 33 embodied on the hub disk 12 on the side facing the ring 19, in the direction of the axial projection 32. The aforementioned recess 33, together with the side of the ring 19 that faces the recess 33, serves to accommodate the axial slide bearing 21 radially inside of the axial projection 32. A chamber 37 is formed radially between the circumference of the axial slide bearing 21 and the axial projections 32 and 34. The axial slide bearing 21, together with the axial projections 32 and 34, effectively form a seal 35.

Advantageously, the axial slide bearing has a supporting surface 55 for the drive-side centrifugal mass 1 on the side facing this centrifugal mass 1 as well as a supporting surface 56 for the output-side centrifugal mass 26 on the side facing this centrifugal mass 26. The two centrifugal masses 1, 26 are braced relative to each other by means of the axial energy storage device 57 in such a way as to be pressed against the respective associated supporting surfaces 55, 56 of the axial slide bearing 21.

Figure 3:
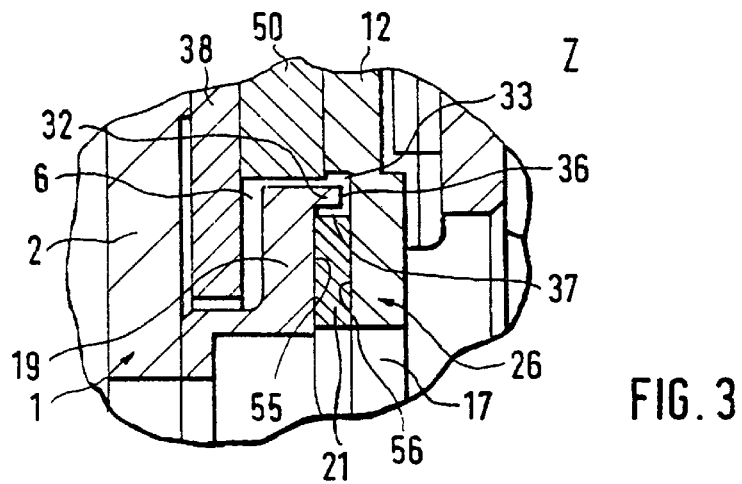
FIG. 3 is similar to FIG. 2, but with a different embodiment of the seal.

FIG. 3 shows an alternate embodiment of the seal 35 in which no axial projection is associated with the recess 33 on the hub disk 12 in the radial extension area of the axial projection 32. In this embodiment, the axial projection 32 on the ring 19 is elongated in the direction of the hub disk 12, so that the axial projection 32 covers the axial slide bearing 21 over almost the entire width of the latter. The gap 36 thus is located at the recess 33.

Finally, it should be noted that the primary flange 2 of the centrifugal mass device in FIG. 1 has supporting pieces (not shown) that project toward the hub disk 12, on each of which supporting pieces a planetary gear 50 is arranged in rotatable fashion. This planetary gear 50 has toothing with the internal gear 11.

When the centrifugal mass device is not in operation, viscous medium located in the grease chamber 6 can drip, e.g., due to gravity, from the aforementioned planetary gear 50 onto the axial projection 32 of the ring 19. Particularly when this axial projection 32 is slightly inclined in the direction of the primary flange 2, the viscous medium that has dripped is discharged in the direction of the primary flange 2 and, during subsequent operation, is passed radially outward through a radially larger ring 38 provided on the planetary gear 50. Only that portion of the viscous medium that drips axially between the planetary gear 50 and the hub disk 12 can find its way into the gap 36 between the axial projections 32 and 34 shown in FIG. 2 or between the axial projection 32 and the recess 33 shown in FIG. 3 and then, after passing through the gap 36, enter the chamber 37. From there, it is impossible for any viscous medium that has dripped radially onto the circumference of the axial slide bearing 21 to flow farther between the ring 19 and the axial slide bearing 21, on the one hand, or between the axial slide bearing 21 and the hub disk 12, on the other, to then emerge through the assembly openings 17. Instead, as soon as the centrifugal mass device is again placed into rotation, the viscous medium located in the chamber 37 is propelled radially outward through the gap 36 and thus is fed back to the grease chamber 6. An emergence of viscous medium from the grease chamber 6 is thus as good as impossible.

Figure 4:
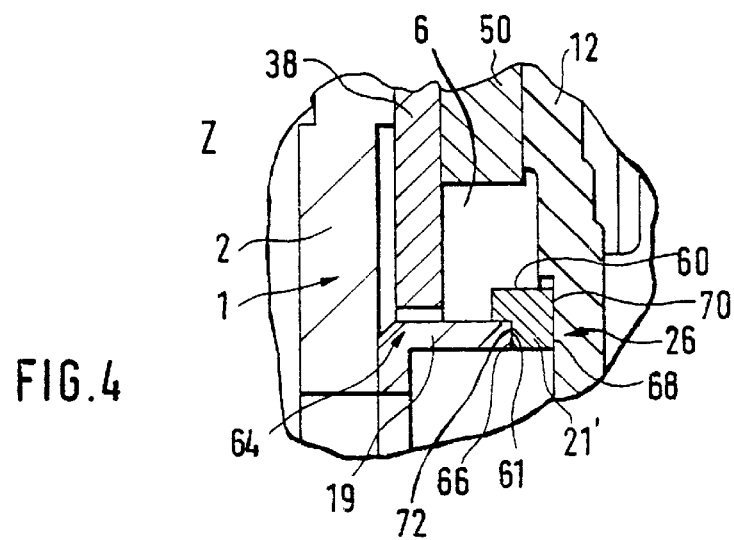
FIG. 4 is similar to FIG. 2, but with a different embodiment of the slide bearing.

FIG. 4 shows a further embodiment of the invention in which the axial slide bearing 21', in its radially outer region, has an axial projection 60. The axial projection 60 extends toward and encompasses the ring 19, which acts as the component 64 secured to the drive-side centrifugal mass 1. Radially inside of the axial projection 60, the axial slide bearing 21 has—also on the side 61 facing the ring 19—a supporting surface 66 for the ring 19. Because the axial slide bearing 21 rests with its other side 68 on the output-side centrifugal mass 26, a first sealing surface 70 is formed between the centrifugal mass 26 and the side 68 of the axial slide bearing 21, while a second sealing surface 72 is formed between the other side 61 of the axial slide bearing 21 in the region of the supporting surface 66 for the ring 19, so that the emergence of viscous medium from the grease chamber 6 is successfully prevented. The sealing surfaces 70 and 72, together with the axial projection 60, act as the seal 35 for the grease chamber 6.

The invention is not limited by the embodiments described above which are presented as examples only but can be modified in various ways within the scope of protection defined by the appended patent claims.

I claim:

1. A centrifugal mass device comprising:

a drive;

a torsion damping device having elastic elements;

a grease chamber containing a viscous medium, said grease chamber accommodating, at least partially, the torsional damping device;

a support having at least one axial slide bearing bordering said grease chamber, the axial slide bearing being effective as a seal for the grease chamber;

at least two centrifugal masses rotatable relative to each other against the effect of the elastic elements of torsional damping device, at least one of said masses being an output-side centrifugal mass and the least one other being a driveside centrifugal mass wherein said output side centrifugal mass is more distant from the drive and is run radially as well as axially relative to the drive-side centrifugal mass via the support;

wherein said axial slide bearing interacts with at least one axial projection provided on at least one of the centrifugal masses, which axial projection is radially offset relative to the axial slide bearing and proximate to, but separated by a gap from, an associated region of the other centrifugal mass.

2. The centrifugal mass device of claim 1, wherein the drive is a crankshaft of an internal combustion engine.

3. The centrifugal mass device of claim 1, wherein the axial projection is on the drive-side centrifugal mass and is located radially outside of the axial slide bearing and extends into a recess of the other of the at least two centrifugal masses, and wherein said recess serves to accommodate the axial slide bearing radially inside of the axial projection.

4. The centrifugal mass device of claim 1, wherein the axial projection is located on the drive-side centrifugal mass and the output-side centrifugal mass has an axial projection embodied in a radial extension area of the axial projection of the drive side centrifugal mass and is axially proximate to, but separated from, the axial projection of the drive side centrifugal mass by a space.

5. The centrifugal mass device of claim 1, wherein the axial slide bearing has supporting surfaces for the centrifugal masses and the centrifugal masses are held in contact with the supporting surfaces by means of an axial energy storage device that acts between the centrifugal masses.

6. A centrifugal mass device comprising:

a drive;

a torsional damping device having elastic elements;

a grease chamber containing a viscous medium, said grease chamber accommodating, at least partially, the torsional damping device;

a support having at least one axial slide bearing bordering said grease chamber, the axial slide bearing being effective as a seal for the grease chamber;

at least two centrifugal masses rotatable relative to each other against the effect of the elastic elements of the torsional damping device, at least one of said masses being an output-side centrifugal mass and the least one other being a driveside centrifugal mass wherein said output side centrifugal mass is more distant from the drive and is run radially as well as axially relative to the drive-side centrifugal mass via the support;

wherein the axial slide bearing rests axially on one side against one of the centrifugal masses and is equipped with at least one axial projection, said axial projection being located on the opposite side of the axial slide bearing and encompassing a component secured to the other centrifugal mass.

7. The centrifugal mass device of claim 6, wherein the drive is a crankshaft of an internal combustion engine.

8. The centrifugal mass device of claim 6, wherein the one side forms a first sealing surface on the axial slide bearing, and a supporting surface for the component, located radially inside of the axial projection, forms a second sealing surface on the axial slide bearing.

9. The centrifugal mass device of claim 8, wherein the axial projection of the axial slide bearing, together with the sealing surfaces of the axial slide bearing, forms the seal for the grease chamber.

10. The centrifugal mass device of claim 6, wherein the axial projection of the axial slide bearing, together with the sealing surfaces of the axial slide bearing, forms the seal for the grease chamber.

* * * * *